US012586542B2

(12) United States Patent
Ko et al.

(10) Patent No.: US 12,586,542 B2
(45) Date of Patent: Mar. 24, 2026

(54) DISPLAY DEVICE, CONTROL CIRCUIT INCLUDED IN THE SAME, AND METHOD OF DRIVING THE SAME

(71) Applicant: SAMSUNG DISPLAY CO., LTD., Yongin-si (KR)

(72) Inventors: Junhan Ko, Yongin-si (KR); Mitsuru Fujii, Yongin-si (KR); Seokyoung Yoon, Yongin-si (KR); Jong-Woong Park, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 0 days.

(21) Appl. No.: 18/638,001

(22) Filed: Apr. 17, 2024

(65) Prior Publication Data

US 2024/0371331 A1 Nov. 7, 2024

(30) Foreign Application Priority Data

May 2, 2023 (KR) ........................ 10-2023-0056908

(51) Int. Cl.
*G09G 3/3291* (2016.01)
*G09G 3/32* (2016.01)

(52) U.S. Cl.
CPC ............ *G09G 3/3291* (2013.01); *G09G 3/32* (2013.01); *G09G 2310/027* (2013.01); *G09G 2320/103* (2013.01); *G09G 2340/16* (2013.01); *G09G 2360/12* (2013.01)

(58) Field of Classification Search
CPC ..... G09G 2320/0271; G09G 2320/103; G09G 2320/0252; G09G 2320/0257; G09G 2320/0261; G09G 2320/0247; G09G 2320/0613; G09G 2320/0626; G09G 2320/0673; G09G 2320/02; G09G 2320/0233; G09G 3/3406; G09G 3/32; G09G 3/36; G09G 3/20; G09G 3/3233; G09G 3/3291; G09G 3/3648; G09G 2340/16; G09G 2310/027; G09G 2310/0232; G09G 2360/12; G09G 2360/144; G09G 2300/026
See application file for complete search history.

(56) References Cited

U.S. PATENT DOCUMENTS

| | | | | |
|---|---|---|---|---|
| 8,907,879 B2* | 12/2014 | Yoshida | G09G 3/2022 345/208 |
| 9,159,284 B2 | 10/2015 | Park et al. | |
| 2006/0152444 A1* | 7/2006 | Park | G09G 3/2051 345/63 |
| 2012/0287104 A1* | 11/2012 | Katsuta | G09G 3/3607 345/88 |

(Continued)

*Primary Examiner* — Dong Hui Liang
(74) *Attorney, Agent, or Firm* — F. CHAU & ASSOCIATES, LLC

(57) ABSTRACT

A display device includes a display panel, a control circuit, and a data driving circuit. The display panel displays an image based on data voltages, and includes a display area divided into a plurality of blocks. The control circuit receives input image data, determines a boot-up area among the blocks when the input image data is a moving image, and generates output image data by increasing low-grayscale values lower than a threshold grayscale among input grayscale values of the input image data in the boot-up area. The data driving circuit generates the data voltages based on the output image data.

19 Claims, 14 Drawing Sheets

(56) References Cited

U.S. PATENT DOCUMENTS

| | | | | |
|---|---|---|---|---|
| 2014/0152717 | A1* | 6/2014 | Seong | G09G 3/3225 345/76 |
| 2017/0169764 | A1* | 6/2017 | Lee | G09G 3/3266 |
| 2018/0012561 | A1* | 1/2018 | Yoon | G09G 5/10 |
| 2018/0025683 | A1* | 1/2018 | Oh | G09G 3/3233 345/690 |

* cited by examiner

DISPLAY DEVICE, CONTROL CIRCUIT INCLUDED IN THE SAME, AND METHOD OF DRIVING THE SAME

CROSS-REFERENCE TO RELATED APPLICATION(S)

This U.S. patent application claims priority under 35 USC § 119 to Korean Patent Application No. 10-2023-0056908 filed on May 2, 2023, in the Korean Intellectual Property Office (KIPO), the entire disclosure of which is incorporated by reference in its entirety herein.

1. TECHNICAL FIELD

Embodiments of the present disclosure are generally directed to a display device. More particularly, embodiments of the present disclosure are directed to a control circuit that compensate image data, a display device that includes the control circuit, and a method that drives the display device.

2. DISCUSSION OF RELATED ART

A display device is a connection medium between a user and information. Examples of the display device include liquid crystal display devices and organic light emitting display devices. The organic light emitting display device displays an image using an organic light emitting diode that generates light by recombination of electrons and holes. The organic light emitting display device has a relatively high response speed and uses relatively little power.

The organic light emitting display device may include a plurality of organic light emitting diodes. The organic light emitting diodes may include a red organic light emitting diode, a green organic light emitting diode, and a blue organic light emitting diode. The red organic light emitting diode, the green organic light emitting diode, and the blue organic light emitting diode may have different driving currents and different capacitances. Compared with the red organic light emitting diode and the blue organic light emitting diode, the green organic light emitting diode may have a small driving current and a large capacitance. Accordingly, when the organic light emitting display device displays a high-grayscale image after displaying a low-grayscale image, a color dragging phenomenon in which the green organic light emitting diode emits light later than the red organic light emitting diode and the blue organic light emitting diode may occur.

SUMMARY

At least one embodiment of the present disclosure provides a display device for mitigating the color dragging phenomenon.

At least one embodiment of the present disclosure provides a control circuit of a display device for mitigating the color dragging phenomenon.

At least one embodiment of the present disclosure provides a method of driving a display device for mitigating the color dragging phenomenon.

A display device according to embodiment includes a display panel, a control circuit, and a data driving circuit. The display panel displays an image based on data voltages, and includes a display area divided into a plurality of blocks. The control circuit receives input image data, determines a boot-up area among the blocks when the input image data is a moving image, and generates output image data by increasing low-grayscale values lower than a threshold grayscale among input grayscale values of the input image data in the boot-up area. The data driving circuit generates the data voltages based on the output image data.

In an embodiment, the control circuit may include an image determiner (e.g., a first logic circuit) which determines whether the input image data is the moving image or a still image, a boot-up area determiner (e.g., a second logic circuit) which determines the boot-up area based on the input image data when the input image data is the moving image, and a data compensator (e.g., a third logic circuit) which generates output grayscale values of the output image data by compensating the low-grayscale values in the boot-up area based on an offset value.

In an embodiment, the output grayscale values corresponding to the low-grayscale values in the boot-up area may be calculated by adding the offset value to the low-grayscale values.

In an embodiment, the output grayscale values corresponding to the low-grayscale values in the boot-up area may be equal to the offset value.

In an embodiment, the control circuit may further include a memory which stores the boot-up area and the offset value.

In an embodiment, in an nth frame, the boot-up area corresponding to the input image data of the nth frame may be stored in the memory, and the input image data of the nth frame may be compensated based on the boot-up area corresponding to the input image data of an $n-1^{th}$ frame stored in the memory, where n is a natural number greater than 1.

In an embodiment, the data compensator may generate green output grayscale values of the output image data by compensating the low-grayscale values in the boot-up area among green input grayscale values of the input image data.

In an embodiment, the threshold grayscale may have a grayscale of 1.

In an embodiment, the threshold grayscale may be a natural number greater than 1.

In an embodiment, the boot-up area may include the blocks having least one high-grayscale value higher than a reference grayscale.

In an embodiment, the boot-up area may include the blocks in which a number of high-grayscale values higher than a reference grayscale is greater than a reference number.

A control circuit of a display device according to an embodiment includes an image determiner (e.g., a first logic circuit), a boot-up area determiner (e.g., a second logic circuit), and a data compensator (e.g., third logic circuit). The image determiner determines whether input image data is a moving image or a still image. The boot-up area determiner determines a boot-up area as blocks of a display panel of the display device having at least one grayscale higher than a reference grayscale when the input image data is the moving image. The data compensator generates output grayscale values of output image data by compensating low-grayscale values lower than a threshold grayscale among input grayscale values of the input image data in the boot-up area based on an offset value.

In an embodiment, the output grayscale values corresponding to the low-grayscale values in the boot-up area may be calculated by adding the offset value to the low-grayscale values.

In an embodiment, the output grayscale values corresponding to the low-grayscale values in the boot-up area may be equal to the offset value.

In an embodiment, the control circuit may further include a memory which stores the boot-up area and the offset value. In an nth frame, the boot-up area corresponding to the input image data of the nth frame may be stored in the memory, and the input image data of the nth frame may be compensated based on the boot-up area corresponding to the input image data of an $n-1^{th}$ frame stored in the memory, where n is a natural number greater than 1.

In an embodiment, the threshold grayscale may have a grayscale of 1.

In an embodiment, the boot-up area may include the blocks in which a number of high-grayscale values higher than the reference grayscale is greater than a reference number. A method of driving a display device according to embodiment includes determining whether input image data is a moving image or a still image, determining a boot-up area among blocks of a display panel of the display device when the input image data is the moving image, generating output grayscale values of output image data by compensating low-grayscale values lower than a threshold grayscale among input grayscale values of the input image data in the boot-up area based on an offset value, and generating data voltages based on the output image data.

In an embodiment, the output grayscale values corresponding to the low-grayscale values in the boot-up area may be calculated by adding the offset value to the low-grayscale values.

In an embodiment, the boot-up area may include the blocks having at least one high-grayscale value higher than a reference grayscale.

In the display device, the control circuit, and the method of driving the display device according to the embodiments, the output image data may be generated by compensating the low-grayscale values in the boot-up area among the input grayscale values of the input image data when displaying the moving image, so that the color dragging phenomenon in the boot-up area may be mitigated. Accordingly, display quality of the display device may be increased.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
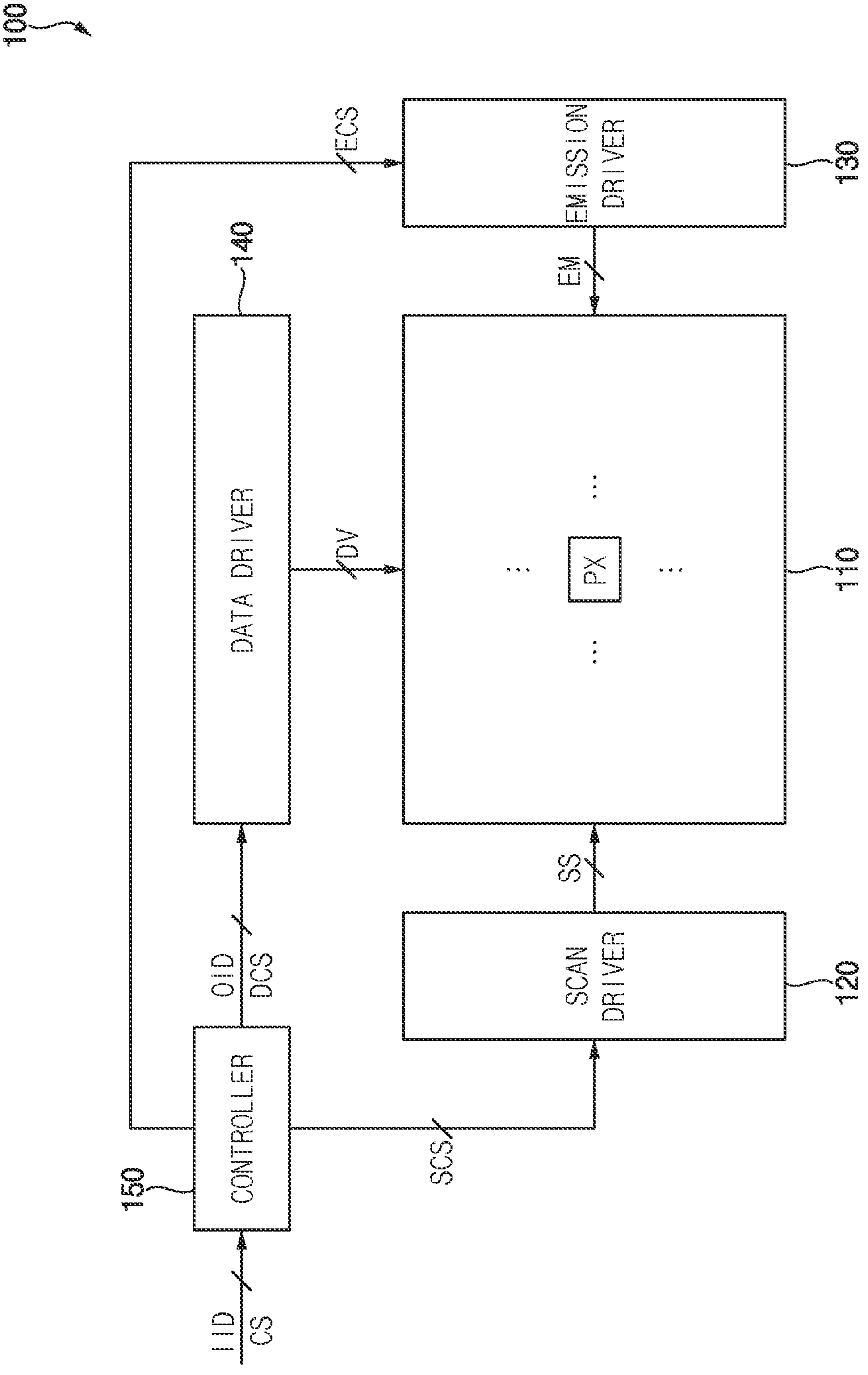
FIG. 1 is a block diagram illustrating a display device according to an embodiment.

Hereinafter, a display device, a control circuit, and a method of driving a display device according to embodiments of the present disclosure will be described in more detail with reference to the accompanying drawings. However, they may be embodied in different forms and should not be construed as limited to the embodiments set forth herein.

It will be understood that when an element is referred to as being "between" two elements, it can be the only element between the two elements, or one or more intervening elements may also be present. The same or similar reference numerals will be used for the same elements in the accompanying drawings.

FIG. 1 is a block diagram illustrating a display device 100 according to an embodiment.

Referring to FIG. 1, the display device 100 includes a display panel 110, a scan driver (or scan driving circuit) 120, an emission driver (or emission driving circuit) 130, a data driver (or data driving circuit) 140, and a controller (or control circuit) 150.

The display panel 110 may display an image based on scan signals SS, emission signals EM, and data voltages DV. The display panel 110 may include a display area from which an image is displayed and a non-display area adjacent to the display area. For example, the non-display area may surround at least one side of the display area.

The display panel 110 may include self-light emitting elements. For example, the self-light elements may emit light without requiring a separate backlight. In an embodiment, the display panel 110 may include an organic light emitting diode as the self-light emitting element. In another embodiment, the display panel 110 may include an inorganic light emitting diode or a quantum-dot light emitting diode as the self-light emitting element. Hereinafter, it will be described that the display panel 110 is an organic light emitting display panel including the organic light emitting diode as the self-light emitting element.

The display panel 110 may include pixels PX. The pixels PX may be disposed in the display area of the display panel 110. In other words, an area of the display panel 110 in which the pixels PX are disposed may be defined as the display area. Each of the pixels PX may emit light based on the scan signal SS, the emission signal EM, and the data voltage DV. The pixels PX may include red pixels emitting red light, green pixels emitting green light, and blue pixels emitting blue light.

The scan driver 120 may provide the scan signals SS to the pixels PX. The scan driver 120 may generate the scan signals SS based on a scan control signal SCS. The scan control signal SCS may include a scan start signal, a scan clock signal, or the like. In an embodiment, the scan driver 120 is disposed in the non-display area of the display panel 110.

The emission driver 130 may provide the emission signals EM to the pixels PX. The emission driver 130 may generate the emission signals EM based on an emission control signal ECS. The emission control signal ECS may include an emission start signal, an emission clock signal, or the like. In an embodiment, the emission driver 130 is disposed in the non-display area of the display panel 110.

The data driver 140 may provide the data voltages DV to the pixels PX. The data driver 140 may generate the data voltages DV based on output image data OID and a data control signal DCS. The output image data OID may include output grayscale values respectively corresponding to the pixels PX. The output grayscales may be digital values. The output image data OID may include red output grayscale values corresponding to the red pixels, green output grayscale values corresponding to the green pixels, and blue output grayscale values corresponding to the blue pixels. The data control signal DCS may include a data enable signal, a data clock signal, or the like. The data driver 140 may convert the digital output grayscale values into the analog data voltages DV. In an embodiment, the data driver 140 may be disposed in the non-display area of the display panel 110 in the form of an integrated circuit (IC) chip, or may be disposed on a printed circuit board which connected to the non-display area of the display panel 110.

The controller 150 may control driving or operation of the scan driver 120, driving or operation of the emission driver 130, and driving or operation of the data driver 140. In an embodiment, the controller 150 may be a timing controller. The controller 150 may provide the scan control signal SCS to the scan driver 120, may provide the emission control signal ECS to the emission driver 130, and may provide the output image data OID and the data control signal DCS to the data driver 140. The controller 150 may generate the scan control signal SCS, the emission control signal ECS, the output image data OID, and the data control signal DCS based on input image data IID and a control signal CS. The input image data IID may include input grayscale values respectively corresponding to the pixels PX. The input image data IID may include red input grayscale values corresponding to the red pixels, green input grayscale values corresponding to the green pixels, and blue input grayscale values corresponding to the blue pixels. The control signal CS may include a horizontal start signal, a vertical start signal, a global clock signal, or the like. In an embodiment, the controller 150 may be disposed in the non-display area of the display panel 110 in the form of an IC chip, or may be disposed on a printed circuit board connected to the non-display area of the display panel 110. In another embodiment, the controller 150 is implemented in the form of an IC chip integrated with the data driver 140. A driving circuit in which the data driver 140 and the controller 150 are integrated may be referred to as a timing-controller embedded driver (TED).

Figure 2:
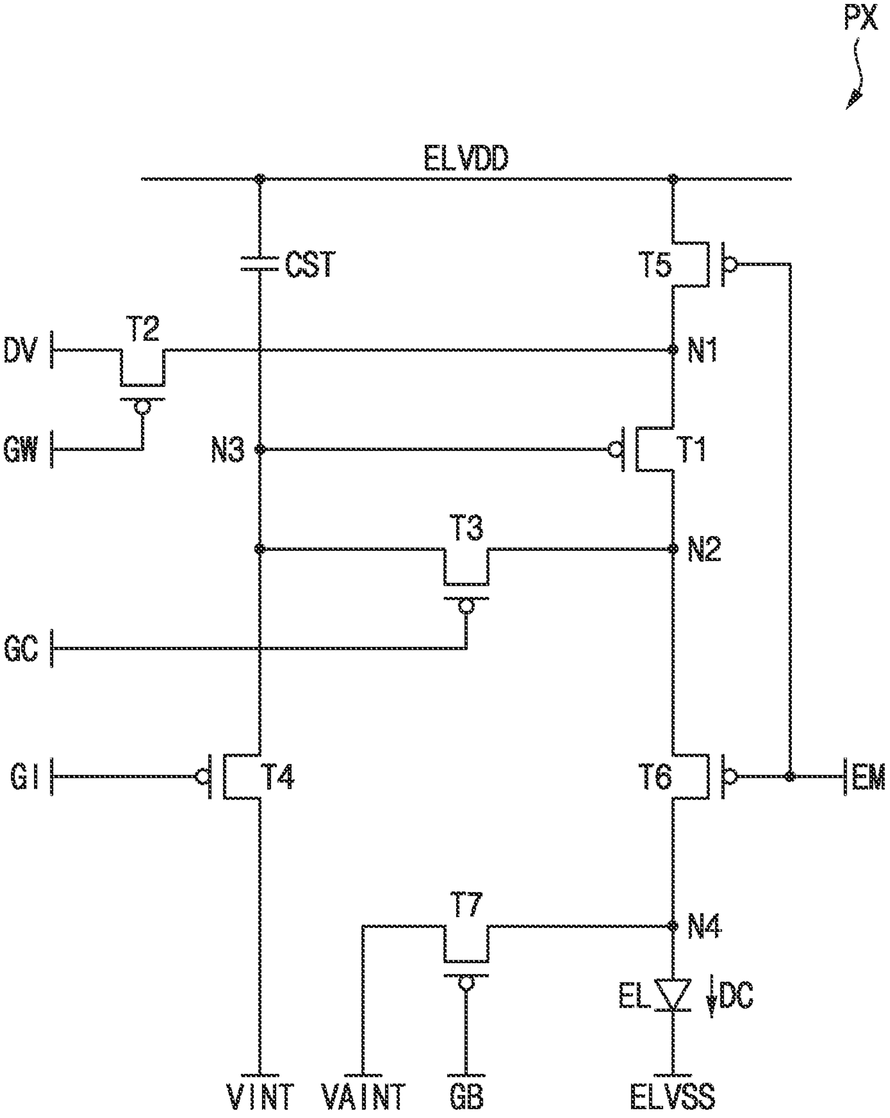
FIG. 2 is a circuit diagram illustrating a pixel according to an embodiment.

FIG. 2 is a circuit diagram illustrating the pixel PX according to an embodiment.

Referring to FIG. 2, the pixel PX includes a first transistor (or driving transistor) T1, a second transistor (or write transistor) T2, a third transistor (or compensation transistor) T3, a fourth transistor (or initialization transistor) T4, a fifth transistor (or first emission transistor) T5, a sixth transistor (or second emission transistor) T6, a seventh transistor (or bypass transistor) T7, a storage capacitor CST, and a light emitting diode EL. The scan signal SS in FIG. 1 may include a first gate signal GW, a second gate signal GC, a third gate signal GI, and a fourth gate signal GB.

The first transistor T1 may include a first electrode connected to a first node N1, a second electrode connected to a second node N2, and a gate electrode connected to a third electrode N3. The first transistor T1 may generate a driving current DC based on a voltage between the first node N1 and the third node N3.

The second transistor T2 may include a first electrode receiving the data voltage DV, a second electrode connected to the first node N1, and a gate electrode receiving the first gate signal GW. The second transistor T2 may transmit the data voltage DV to the first node N1 in response to the first gate signal GW. For example, the second transistor T2 may transmit the data voltage DV to the first node N1 when a level of the first gate signal GW changes from a first logic state to a second other logic state.

The third transistor T3 may include a first electrode connected to the second node N2, a second electrode connected to the third node N3, and a gate electrode receiving the second gate signal GC. The third transistor T3 may connect the second node N2 and the third node N3 in response to the second gate signal GC. For example, the transistor T3 may connect the second node N2 and the third node N3 when a level of the second gate signal GC changes from a first logic state to a second other logic state. Accordingly, the data voltage DV reflecting a threshold voltage of the first transistor T1 may be written to the third node N3.

The fourth transistor T4 may include a first electrode receiving a first initialization voltage VINT, a second electrode connected to the third node N3, and a gate electrode receiving the third gate signal GI. The fourth transistor T4 may transmit the first initialization voltage VINT to the third node N3 in response to the third gate signal GI. For example, the fourth transistor T4 may transmit the first initialization voltage VINT to the third node N3 when a level of the third gate signal GI changes from a first logic state to a second other logic state. The first initialization voltage VINT may be less than the data voltage DV. When the fourth transistor T4 is turned on, a current may flow from the third node N3 through the fourth transistor T4, and thus, a voltage of the third node N3 may be initialized.

The fifth transistor T5 may include a first electrode receiving a first driving voltage ELVDD, a second electrode connected to the first node N1, and a gate electrode receiving the emission signal EM. The fifth transistor T5 may transmit the first driving voltage ELVDD to the first node N1 in response to the emission signal EM. For example, the fifth transistor T5 may transmit the first driving voltage ELVDD to the first node N1 when a level of the emission signal EM changes from a first logic state to a second other logic state.

The sixth transistor T6 may include a first electrode connected to the second node N2, a second electrode connected to a fourth node N4, and a gate electrode receiving the emission signal EM. The sixth transistor T6 may connect the second node N2 and the fourth node N4 in response to the emission signal EM. For example, the sixth transistor T6 may connect the second node N2 to the fourth node N4 when a level of the emission signal EM changes from the first logic state to the second logic state.

The seventh transistor T7 may include a first electrode receiving a second initialization voltage VAINT, a second electrode connected to the fourth node N4, and a gate electrode receiving the fourth gate signal GB. The seventh transistor T7 may transmit the second initialization voltage VAINT to the fourth node N4 in response to the fourth gate signal GB. For example, the seventh transistor T7 may transmit the second initialization voltage VAINT to the fourth node N4 when a level of the fourth gate signal GB changes from the first logic state to the second logic state. In an embodiment, the second initialization voltage VAINT is less than a second driving voltage ELVSS. When the seventh transistor T7 is turned on, a current may flow from the fourth node N4 through the seventh transistor T7, and thus, a voltage of the fourth node N4 may be initialized.

FIG. 2 illustrates an embodiment in which each of the first transistor T1, the second transistor T2, the third transistor T3, the fourth transistor T4, the fifth transistor T5, the sixth transistor T6, and the seventh transistor T7 is a P-type transistor (e.g., a PMOS transistor), but the present disclosure is not limited thereto. In another embodiment, at least one of the first transistor T1, the second transistor T2, the third transistor T3, the fourth transistor T4, the fifth transistor T5, the sixth transistor T6, and the seventh transistor T7 may be an N-type transistor (e.g., an NMOS transistor).

The storage capacitor CST may include a first electrode connected to the third node N3 and a second electrode receiving the first driving voltage ELVDD. The storage capacitor CST may maintain the voltage of the third node N3.

FIG. 2 illustrates an embodiment in which the pixel PX includes 7 transistors and 1 capacitor, but the present disclosure is not limited thereto. In another embodiment, the pixel PX may include 2 to 6 or 8 or more transistors and/or 2 or more capacitors.

The light emitting diode EL may include a first electrode (or anode) connected to the fourth node N4 and a second electrode (or cathode) receiving the second driving voltage ELVSS. The light emitting diode EL may emit light having luminance corresponding to the driving current DC. In an embodiment, the second driving voltage ELVSS is less than the first driving voltage ELVDD.

In an embodiment, the light emitting diode EL may be an organic light emitting diode. In another embodiment, the light emitting diode EL may be an inorganic light emitting diode or a quantum-dot light emitting diode. Hereinafter, it will be described that the light emitting diode EL is the organic light emitting diode.

Figure 3:
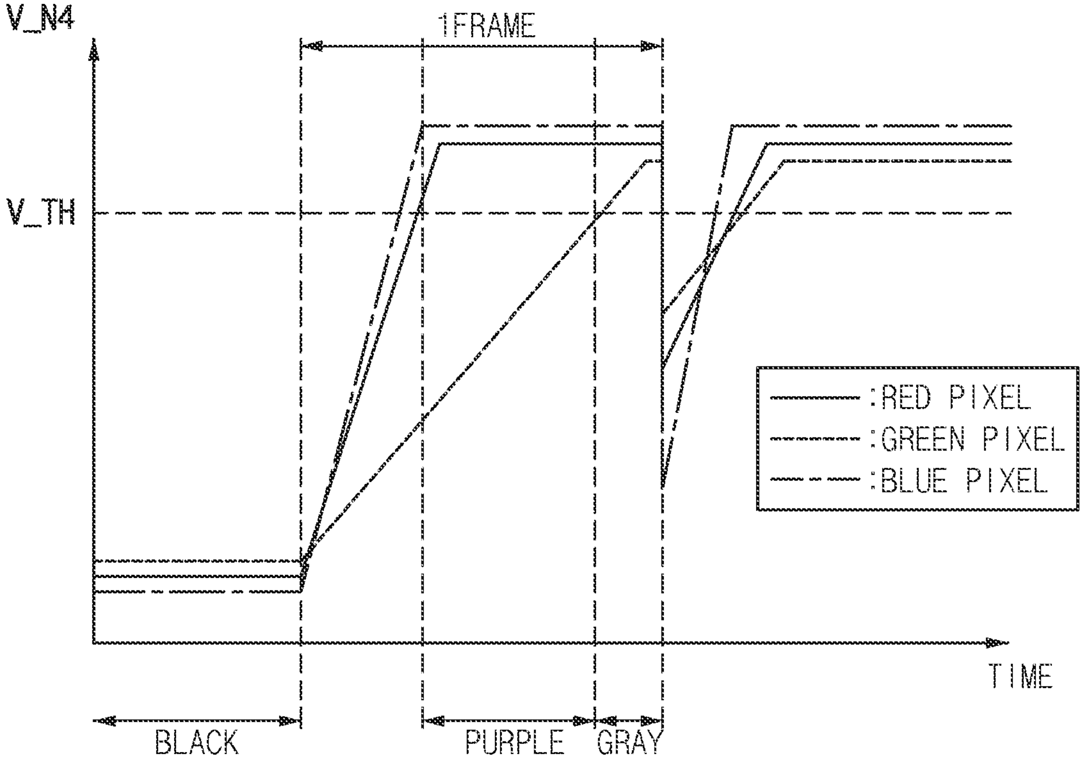
FIG. 3 is a graph illustrating voltages of light emitting diodes of red, green and blue pixels based on input image data which is not compensated.

FIG. 3 is a graph illustrating voltages of light emitting diodes of red, green and blue pixels based on input image data which is not compensated.

Referring to FIG. 3, when the input grayscale values of the input image data have a grayscale of 0 (or a black grayscale), a voltage V_N4 of a first electrode of a red light emitting diode of the red pixel, a voltage of a first electrode of a green light emitting diode of the green pixel, and a voltage V_N4 of a first electrode of a blue light emitting diode of the blue pixel are less than a threshold voltage V_TH of the light emitting diode. The light emitting diode may emit light when the voltage V_N4 of the first electrode of the light emitting diode is greater than the threshold voltage V_TH of the light emitting diode. Accordingly, when the input grayscale values of the input image data have a grayscale of 0, the red, green, and blue pixels do not emit light, and the display device may display a black image.

When the input grayscale values of the input image data increase from a grayscale of 0 to a grayscale greater than the grayscale of 0 (for example, a grayscale of 20), the voltage V_N4 of the first electrode of the red light emitting diode, the voltage V_N4 of the first electrode of the green light emitting diode, and the voltage V_N4 of the first electrode of the blue light emitting diode may increase. The light emitting diodes may include different organic light emitting materials according to color, and the light emitting diodes may have different capacitances and different driving currents according to color. In an embodiment, a capacitance of the green light emitting diode is greater than a capacitance of the red light emitting diode and a capacitance of the blue light emitting diode. In an embodiment, a driving current of the green light emitting diode is less than a driving current of the red light emitting diode and a driving current of the blue light emitting diode. In an embodiment, an increase rate of the voltage V_N4 of the first electrode of the green light emitting diode which has the relatively large capacitance and the relatively small driving current is less than an increase rate of the voltage V_N4 of the first electrode of the red light emitting diode and an increase rate of the voltage V_N4 of the first electrode of the blue light emitting diode which have the relatively small capacitances and the relatively large driving currents. Accordingly, the voltage V_N4 of the first electrode of the red light emitting diode and the voltage V_N4 of the first electrode of the blue light emitting diode may reach the threshold voltage V_TH of the light emitting diode earlier than the voltage V_N4 of the first electrode of the green light emitting diode. Accordingly, during a frame period in which a display device starts to display a gray image after displaying the black image, a color dragging phenomenon may occur. For example, a purple image in which red and blue are mixed is displayed before displaying the gray image may occur. The color dragging phenomenon may be recognized by a user, and thus, display quality of the display device may become degraded.

Figure 4:
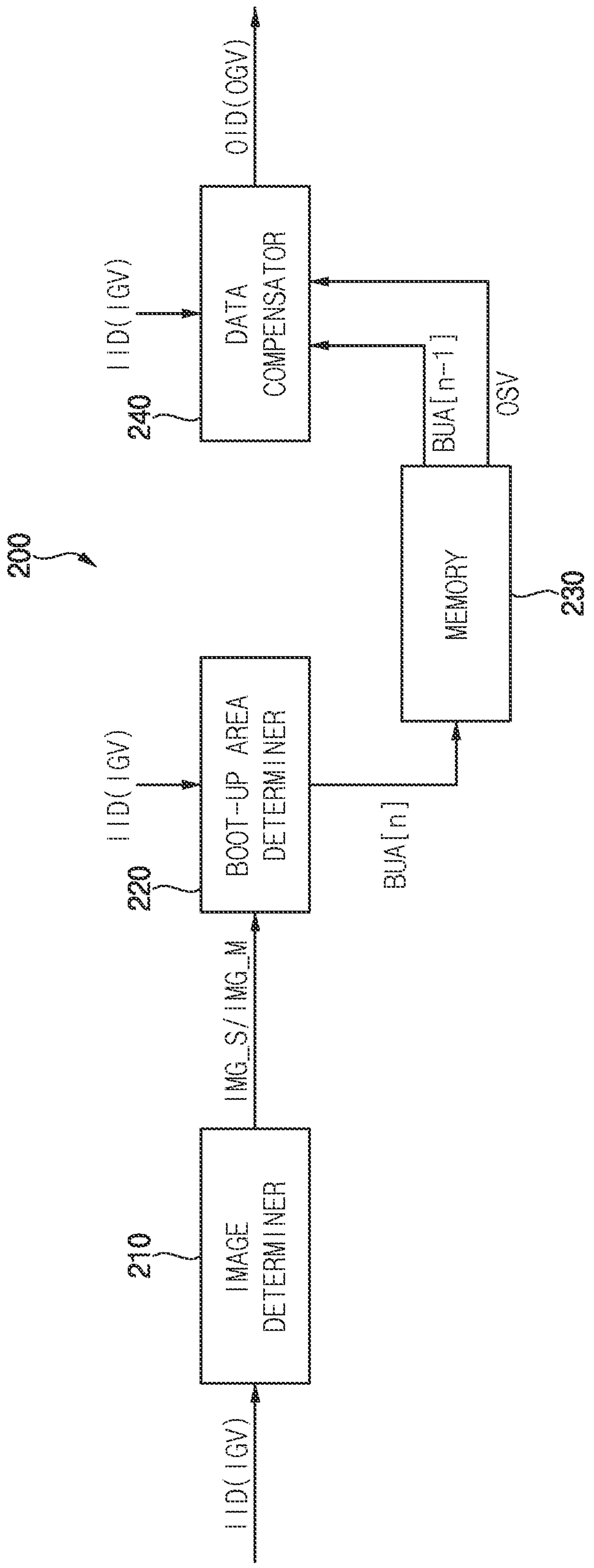
FIG. 4 is a block diagram illustrating a controller according to an embodiment.

FIG. 4 is a block diagram illustrating a controller 200 according to an embodiment. The controller 200 may correspond to the controller 150 in FIG. 1.

Referring to FIG. 4, the controller 200 may include an image determiner 210 (e.g., a first logic circuit), a boot-up area determiner 220 (e.g., a second logic circuit), a memory 230, and a data compensator 240 (e.g., a third logic circuit, a compensation circuit, etc.).

The image determiner 210 may determine whether the input image data IID is a moving image IMG_M or a still image IMG_S. In an embodiment, the image determiner 210 store the input image data IID of the previous frame, and determines whether the input image data IID is the moving image IMG_M or the still image IMG_S by comparing the input image data IID of the current frame with the input image data IID of the previous frame. In another embodiment, the image determiner 210 receives a signal indicating whether the input image data IID is the moving image IMG_M or the still image IMG_S, and determines whether the input image data IID is the moving image IMG_M or the still image IMG_S based on the signal. For example, the signal may be provided by an external device.

When the input image data IID is the moving image IMG_M, the controller 200 may generate the output image data OID by compensating the input image data IID. When the input image data IID is the moving image IMG_M, at least one pixel of pixels displaying a low-grayscale value in an $n-1^{th}$ frame may display a high-grayscale value in an $n^{th}$ frame, and a compensation of the input image data IID may be performed to prevent a color dragging phenomenon caused by a pixel displaying the high-grayscale value after displaying the low-grayscale value. In an embodiment, the high-grayscale is greater than or equal to a reference percent of the maximum representable grayscale. For example, the reference percent could be 80 percent, 85 percent, 90 percent, 95 percent, etc.

In an embodiment, the boot-up area determiner 220 determines a boot-up area BUA based on the input image data IID when the input image data IID is the moving image IMG_M. The boot-up area BUA may be an area for increasing low-grayscale values lower than a threshold grayscale among the input grayscale values IGV of the input image data IID.

In an $n^{th}$ frame, the boot-up area determiner 220 may determine the boot-up area BUA[n] corresponding to the input image data IID of the $n^{th}$ frame based on the input image data IID of the $n^{th}$ frame. For example, the boot-up area determiner 220 may identify a part of the $n^{th}$ frame to be used as the boot-up area BUA[n].

The memory 230 may store the boot-up area BUA and an offset value OSV. In the $n^{th}$ frame, the boot-up area BUA[n] corresponding to the input image data IID of the $n^{th}$ frame determined by the boot-up area determiner 220 may be stored in the memory 230. The offset value OSV may be a predetermined value. The stored boot-up area BUA may be information indicating positions of some of the blocks within the $n^{th}$ frame and their grayscale values.

The data compensator 240 may generate the output grayscale values OGV of the output image data OID by compensating the low-grayscale values of the input image data IID in the boot-up area BUA based on the offset value OSV. In an embodiment, the input image data IID of the $n^{th}$ frame is compensated based on the boot-up area BUA[n−1] corresponding to the input image data IID of the $n-1^{th}$ frame stored in the memory 230. In other words, the input image data IID of the current frame may be compensated based on the boot-up area BUA corresponding to the input image data IID of the previous frame. When the input image data IID is the moving image IMG_M, since a difference between the $n-1^{th}$ frame of the moving image IMG_M and the $n^{th}$ frame of the moving image IMG_M is not large, the input image data IID of the $n^{th}$ frame may be compensated based on the boot-up area BUA[n−1] corresponding to the input image data IID of the $n-1^{th}$ frame.

In an embodiment, the data compensator 240 generates the green output grayscale values of the output image data OID by compensating low-grayscale values among the green input grayscale values of the input image data IID in the boot-up area BUA to mitigate the color dragging phenomenon due to a delay in emission of the green pixels, and does not compensate the red input grayscale values and the blue input grayscale values of the input image data IID. The low-grayscale values may be less than a threshold value. In another embodiment, the data compensator 240 generates the output image data OID by compensating low-grayscale values among the red input grayscale values, low-grayscale values among the green input grayscale values, and low-grayscale values among the blue input grayscale values of the input image data IID in the boot-up area BUA to reduce a difference between light emitting diodes having different characteristics according to color. In this case, the offset value OSV may be different for each red input grayscale value, green input grayscale value, and blue input grayscale value.

In an embodiment when the input image data IID is the still image IMG_S, the controller 200 generates the output image data OID equal to the input image data IID without compensating the input image data IID. When the input image data IID is the still image IMG_S, since all pixels displaying the low-grayscale values in the $n-1^{th}$ frame display the low-grayscale values in the $n^{th}$ frame and all pixels displaying the high-grayscale values in the $n-1^{th}$ frame display the high-grayscale values in the $n^{th}$ frame, compensation of the input image data IID to prevent the color dragging phenomenon may not be required.

Figure 5:
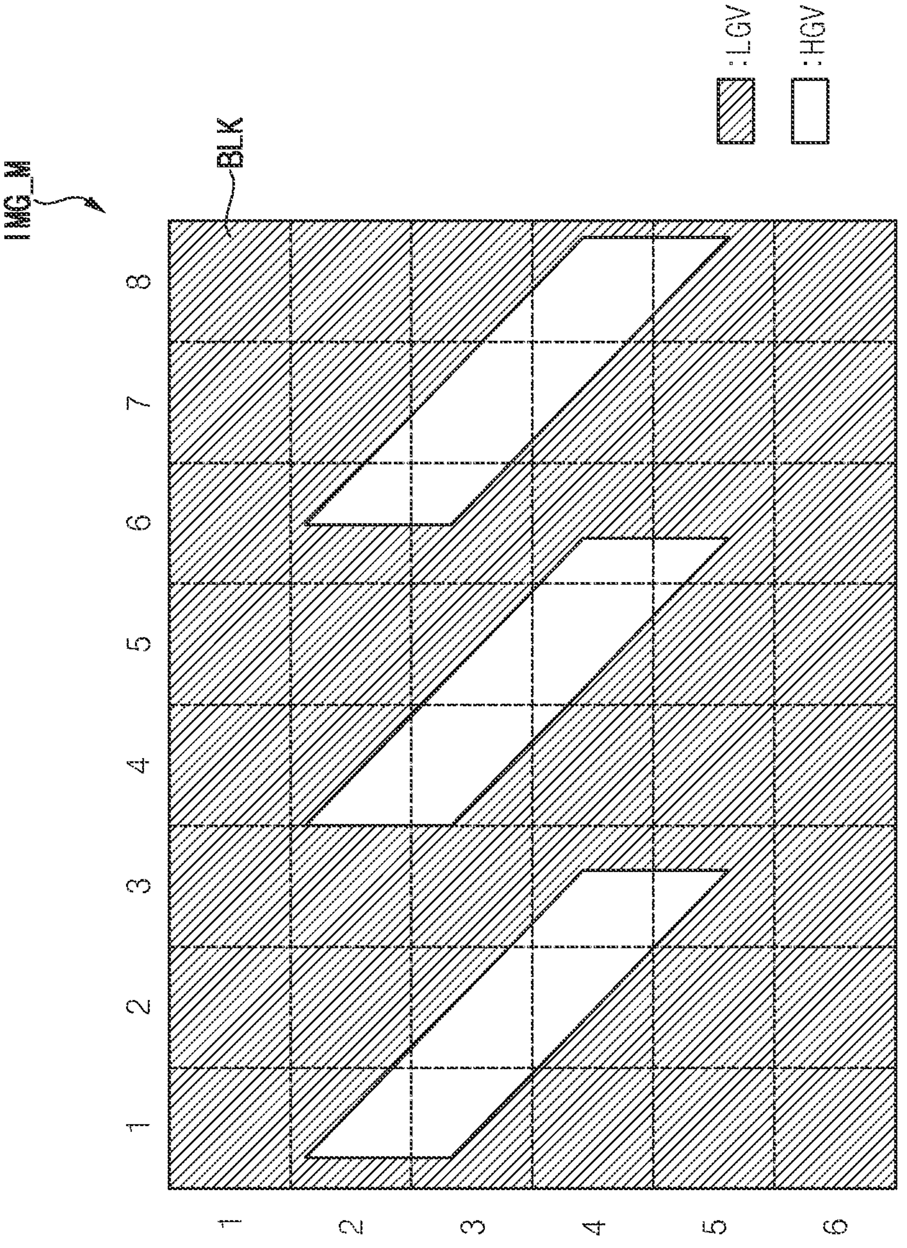
FIG. 5 is a diagram illustrating an nth frame of a moving image corresponding to input image data.

FIG. 5 is a diagram illustrating the $n^{th}$ frame of the moving image IMG_M corresponding to input image data.

Referring to FIG. 5, the display area may be divided into a plurality of blocks BLK. Each of the blocks BLK may include at least one pixel. FIG. 5 illustrates an embodiment in which the display area is divided into 48 blocks BLK arranged in a matrix form of 6 block rows and 8 block columns, but the present disclosure is not limited thereto. In another embodiment, the display area may be divided into blocks arranged in a matrix form of 1 to 5 or 7 or more block rows and/or 1 to 7 or 9 or more block columns.

In the $n^{th}$ frame of the moving image IMG_M illustrated in FIG. 5, the low-grayscale values LGV among the input grayscale values IGV of the input image data IID may be applied to pixels located in a dark portion, and the high-grayscale values HGV higher than a reference grayscale among the input grayscale values IGV of the input image data IID may be applied to pixels located in a bright portion. The low-grayscale values LGV may be less than a first reference grayscale and the high-grayscale values HGV may be higher than a second reference grayscale, where the first reference grayscale is lower than the second reference grayscale.

Figure 6:
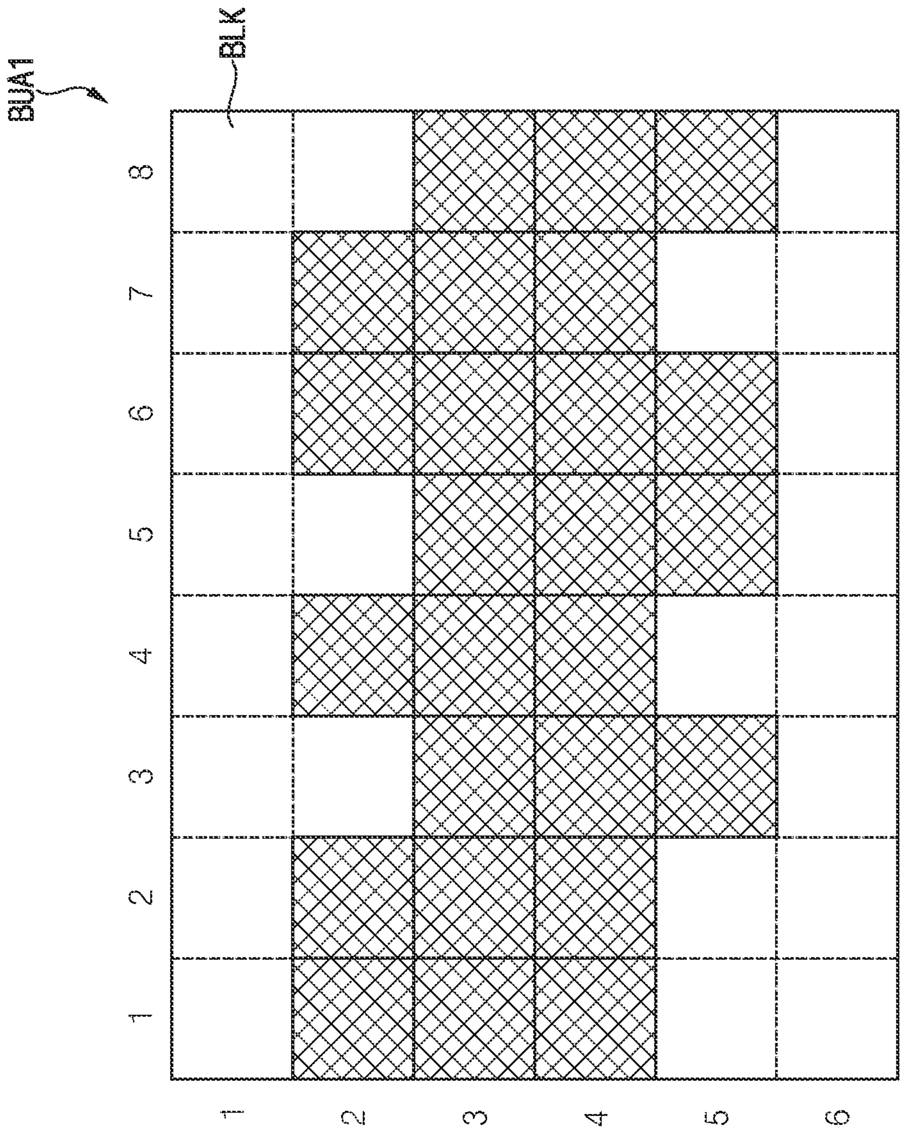
FIG. 6 is a diagram illustrating a boot-up area according to an embodiment with respect to the nth frame of the moving image in FIG. 5.

FIG. 6 is a diagram illustrating a boot-up area BUA1 according to an embodiment with respect to the $n^{th}$ frame of the moving image IMG_M in FIG. 5.

Referring to FIG. 6, in an embodiment, the boot-up area BUA1 may include blocks including at least one high-grayscale value HGV among the blocks BLK. For example, the $n^{th}$ boot-up area BUA1 for the $n^{th}$ frame of the moving image IMG_M in FIG. 5 may include 2×1, 2×2, 2×4, 2×6, 2×7, 3×1, 3×2, 3×3, 3×4, 3×5, 3×6, 3×7, 3×8, 4×1, 4×2, 4×3, 4×4, 4×5, 4×6, 4×7, 4×8, 5×3, 5×5, 5×6, and 5×8 blocks. For example, the boot-up area BUA1 may include only the hatched blocks. For example, the 2×2 block is included since at least part of the 2×2 block in FIG. 5 has a high-grayscale value HGV, and the 2×3 block is not included since no part of the 2−x3 block in FIG. 3 has the high-grayscale. When the input image data is the moving image IMG_M, some pixels among pixels included in a block including at least one high-grayscale value HGV in the $n^{th}$ frame may display the high-grayscale value HGV in an $n+1^{th}$ frame after displaying the low-grayscale value LGV in the $n^{th}$ frame, and to prevent the color dragging caused by these pixels, the block including at least one high-grayscale value HGV in the $n^{th}$ frame may be included in the boot-up area BUA1 for the $n^{th}$ frame of the moving image IMG_M.

Figure 7:
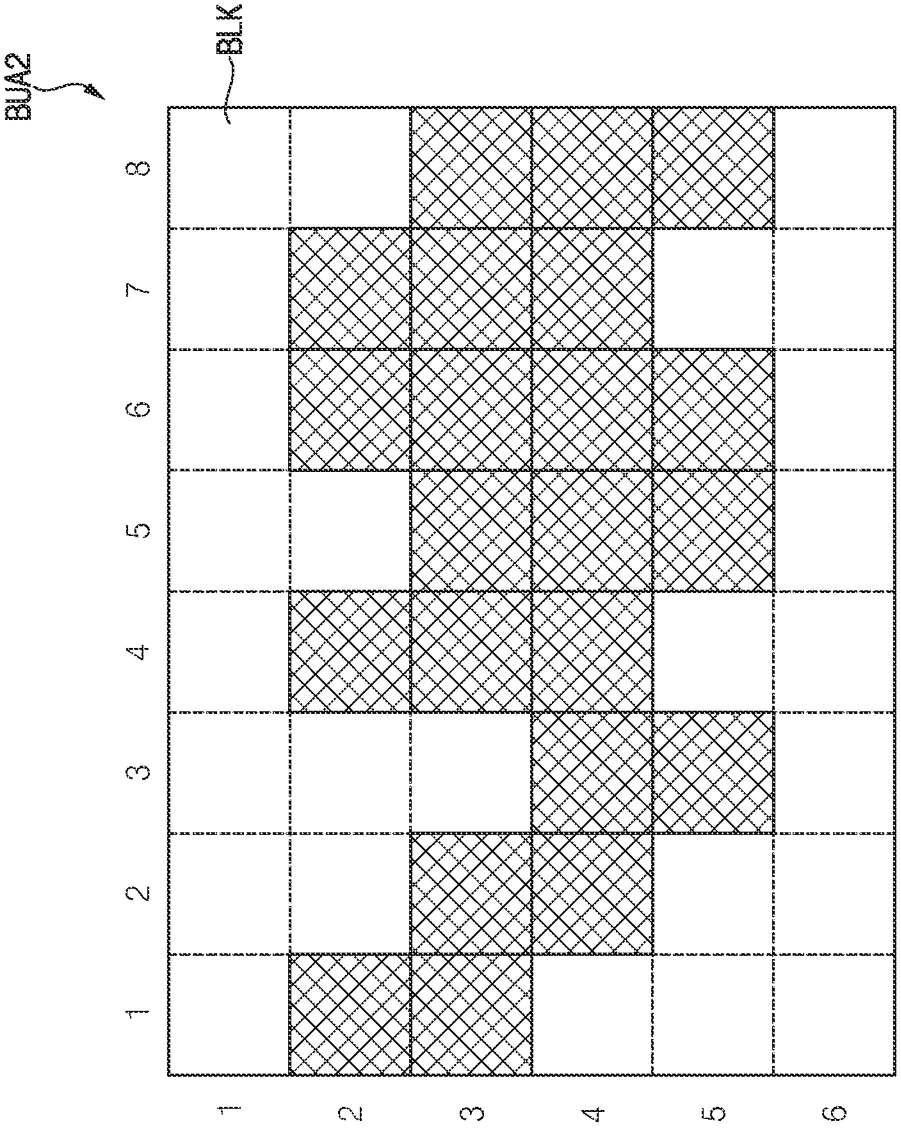
FIG. 7 is a diagram illustrating a boot-up area according to an embodiment with respect to the nth frame of the moving image in FIG. 5.

FIG. 7 is a diagram illustrating a boot-up area BUA2 according to an embodiment with respect to the $n^{th}$ frame of the moving image IMG_M in FIG. 5.

Referring to FIG. 7, in an embodiment, the boot-up area BUA2 may include blocks in which the number of the high-grayscale values HGV is greater than a reference number among the blocks BLK. The reference number may be a predetermined number. For example, the $n^{th}$ boot-up area BUA2 for the $n^{th}$ frame of the moving image IMG_M in FIG. 5 may include 2×1, 2×4, 2×6, 2×7, 3×1, 3×2, 3×4, 3×5, 3×6, 3×7, 3×8, 4×2, 4×3, 4×4, 4×5, 4×6, 4×7, 4×8, 5×3, 5×5, 5×6, and 5×8 blocks. The 2×2, 3×3, and 4×1 blocks among the blocks included in the boot-up area BUA1 illustrated in FIG. 6 are not included in the boot-up area BUA2 because the number of the high-grayscale values HGV is less than or equal to the reference number. For example, as shown in FIG. 5, even though a small part of the 2×2 block has the high-grayscale, the reference number was set too low to allow this block to be included. When the input image data is the moving image IMG_M, although pixels included in a block in which the number of the high-grayscale values HGV is less than or equal to the reference number among the blocks including at least one high-grayscale value HGV in the $n^{th}$ frame display the high-grayscale value HGV in the $n+1^{th}$ frame after displaying the low-grayscale value LGV in the $n^{th}$ frame, the color dragging phenomenon may not be conspicuously recognized, and power consumption of the display device may be reduced as the number of blocks included in the boot-up area BUA2 decreases.

Figure 8:
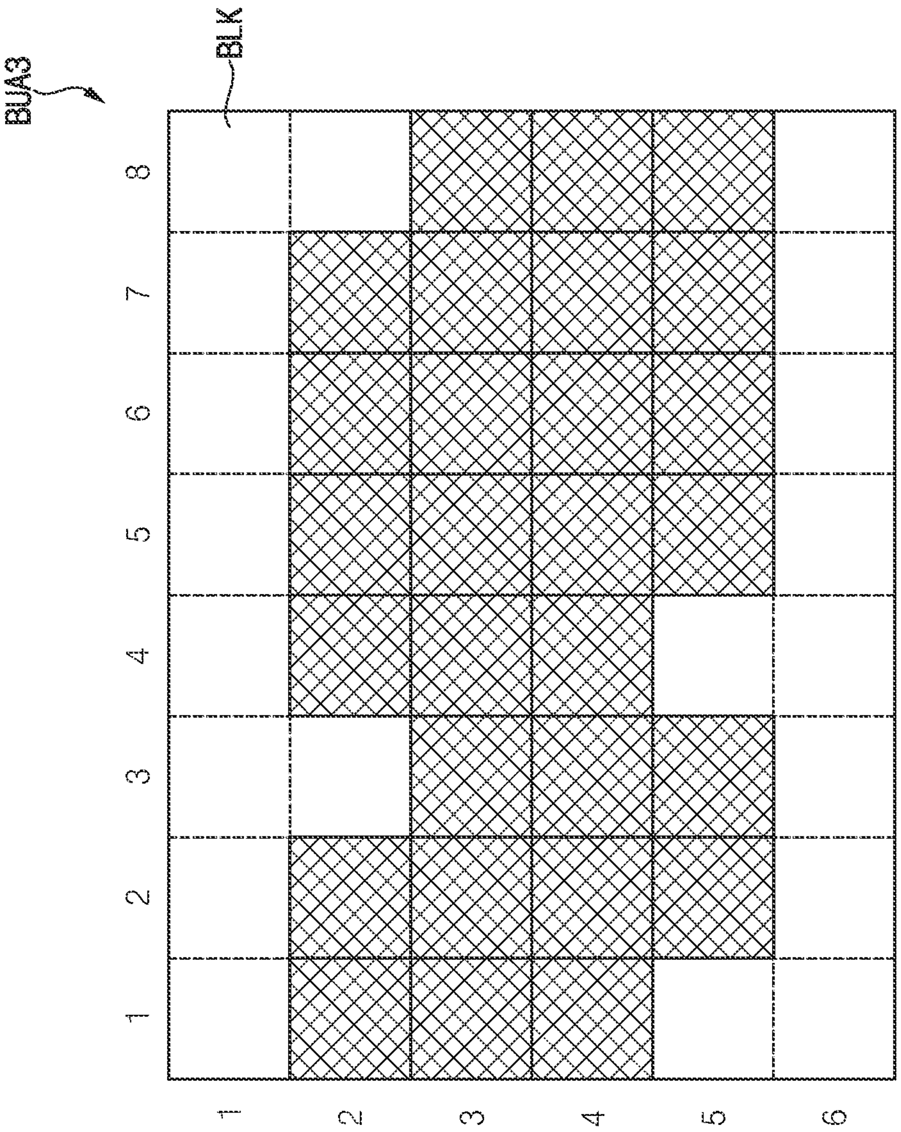
FIG. 8 is a diagram illustrating a boot-up area according to an embodiment with respect to the nth frame of the moving image in FIG. 5.

FIG. 8 is a diagram illustrating a boot-up area BUA3 according to an embodiment with respect to the $n^{th}$ frame of the moving image IMG_M in FIG. 5.

Referring to FIG. 8, in an embodiment, the boot-up area BUA3 may include blocks including at least one high-grayscale value HGV among the blocks BLK and blocks adjacent to some of the blocks. For example, the $n^{th}$ boot-up area BUA3 for the $n^{th}$ frame of the moving image IMG_M in FIG. 5 may include 2×1, 2×2, 2×4, 2×5, 2×6, 2×7, 3×1, 3×2, 3×3, 3×4, 3×5, 3×6, 3×7, 3×8, 4×1, 4×2, 4×3, 4×4, 4×5, 4×6, 4×7, 4×8, 5×2, 5×3, 5×5, 5×6, 5×7, and 5×8 blocks. The boot-up area BUA3 may include the 2×5, 5×2, and 5×7 blocks in addition to the blocks included in the boot-up area BUA1 illustrated in FIG. 6. For example, when a block does not have any high-grayscale but is adjacent to two or more blocks with some high-grayscale, this block may be included. When the input image data is the moving image IMG_M, some pixels of the pixels included in blocks adjacent to blocks including at least one high-grayscale value HGV in the $n^{th}$ frame among blocks including only low-grayscale values LGV in the $n^{th}$ frame may display the high-grayscale value HGV in the $n+1^{th}$ frame after displaying the low-grayscale value LGV in the $n^{th}$ frame. To prevent the color dragging phenomenon caused by the some pixels, the blocks adjacent to the blocks including at least one high-grayscale value HGV may be included in the boot-up area BUA3 for the $n^{th}$ frame of the moving image IMG_M although only including the low-grayscale value LGV in the $n^{th}$ frame.

Figure 9:
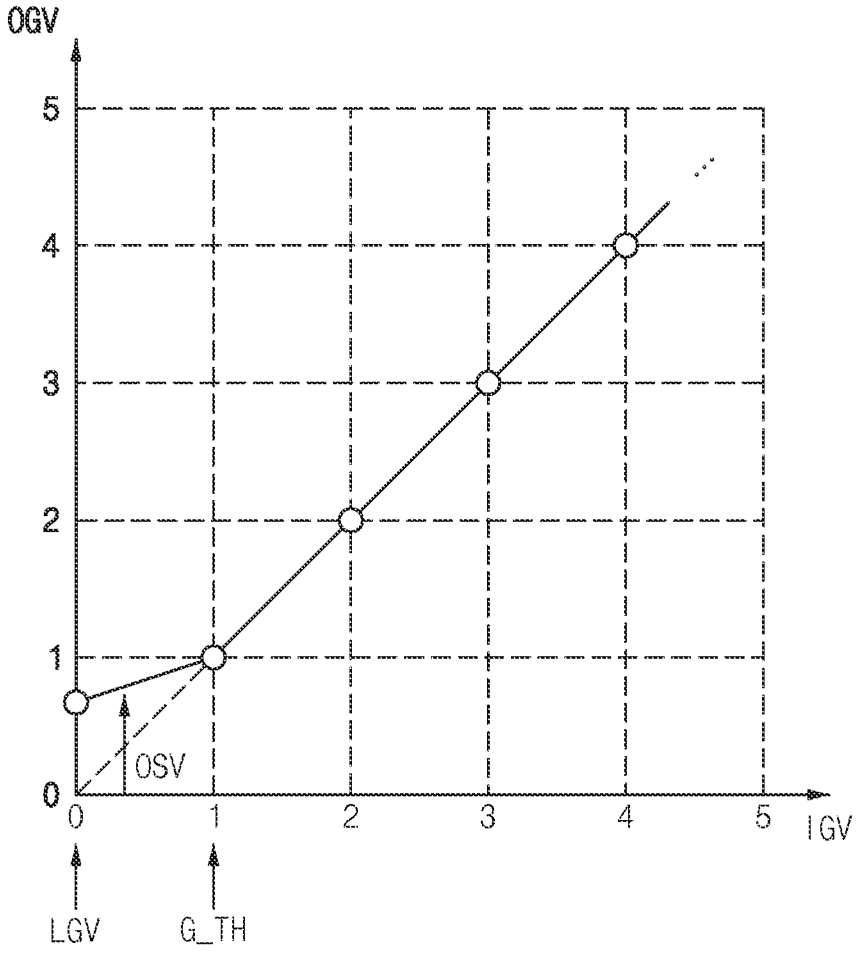
FIG. 9 is a graph illustrating a relationship between an input grayscale value and an output grayscale value according to an embodiment.

FIG. 9 is a graph illustrating a relationship between the input grayscale value IGV and the output grayscale value OGV according to an embodiment.

Referring to FIG. 9, in an embodiment, a threshold grayscale G_TH, which is a reference for determining the low-grayscale value LGV, may have a grayscale of 1. In such an embodiment, the low-grayscale value LGV may have a grayscale of 0.

In an embodiment, the output grayscale values OGV corresponding to the low-grayscale values LGV in the boot-up area BUA may be calculated by adding the offset value OSV to the low-grayscale values LGV. For example, the offset value OSV may have a value greater than a grayscale of 0 and less than a grayscale of 1. The output grayscale values OGV corresponding to the input grayscale values IGV greater than or equal to the threshold grayscale G_TH in the boot-up area BUA may be equal to the input grayscale values IGV. Accordingly, the output grayscale values OGV corresponding to the input grayscale values IGV in the boot-up area BUA may be calculated by Equation 1.

$$OGV = IGV + OSV \text{ for } IGV < \text{G\_TH} \qquad \text{[Equation 1]}$$

$$OGV = IGV \text{ for } IGV \geq \text{G\_TH}$$

In an embodiment, the output grayscale values OGV corresponding to the low-grayscale values LGV in the boot-up area BUA is equal to the offset value OSV. The output grayscale values OGV corresponding to the input grayscale values IGV greater than or equal to the threshold grayscale G_TH in the boot-up area BUA may be equal to the input grayscale values IGV. Accordingly, the output grayscale values OGV corresponding to the input grayscale values IGV in the boot-up area BUA may be calculated by Equation 2.

$$OGV = OSV \text{ for } IGV < \text{G\_TH} \qquad \text{[Equation 2]}$$

$$OGV = IGV \text{ for } IGV \geq \text{G\_TH}$$

In an embodiment illustrated in FIG. 9, since the low-grayscale values LGV have a grayscale of 0, the output grayscale values OGV calculated by Equation 1 and the output grayscale values OGV calculated by Equation 2 may be equal to each other.

Figure 10:
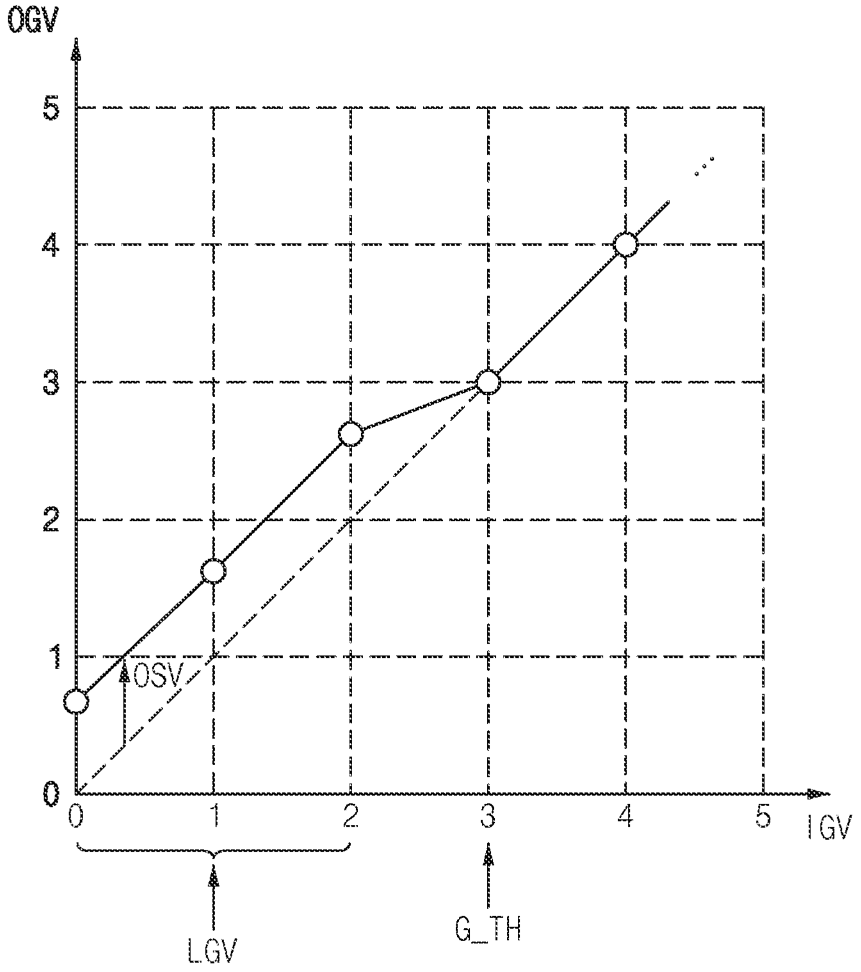
FIG. 10 is a graph illustrating a relationship between the input grayscale value and the output grayscale value according to an embodiment.
Figure 11:
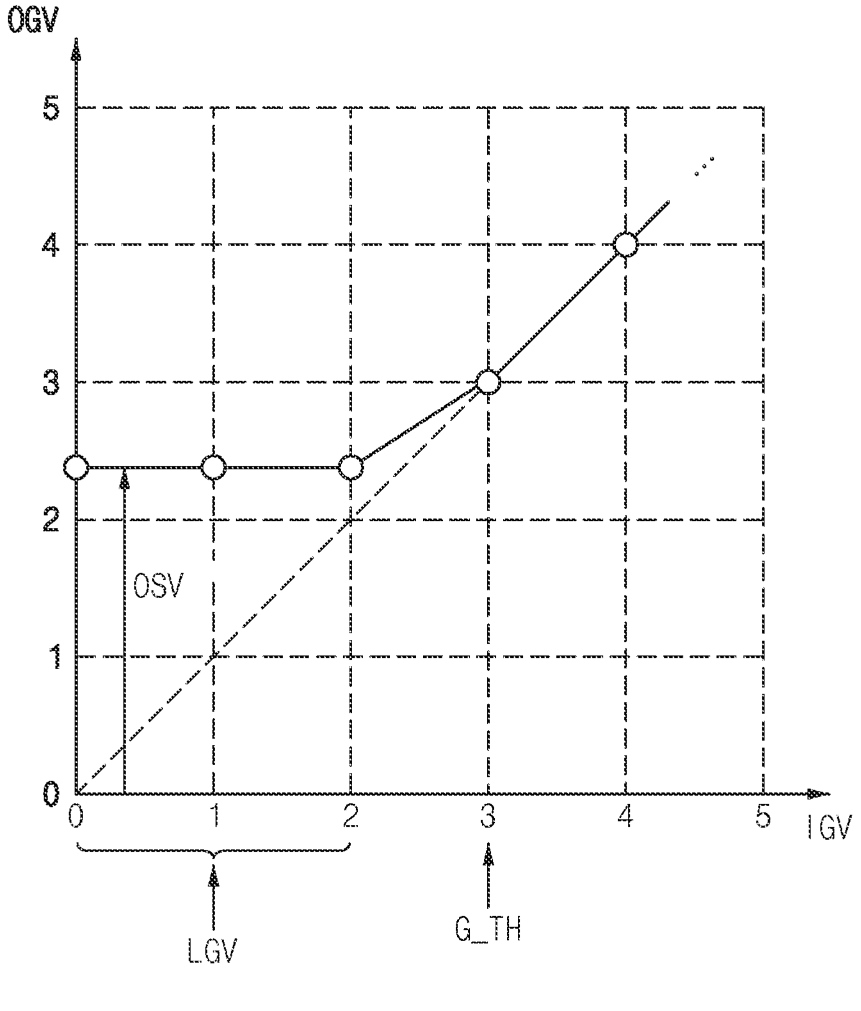
FIG. 11 is a graph illustrating a relationship between the input grayscale value and the output grayscale value according to an embodiment.

FIG. 10 is a graph illustrating a relationship between the input grayscale value IGV and the output grayscale value OGV according to an embodiment. FIG. 11 is a graph illustrating a relationship between the input grayscale value IGV and the output grayscale value OGV according to an embodiment.

Referring to FIGS. 10 and 11, in an embodiment, the threshold grayscale G_TH may be m grayscale, where m is a natural number greater than 1. For example, as illustrated in FIGS. 10 and 11, when the threshold grayscale G_TH is a grayscale of 3, the low-grayscale value LGV may range from a grayscale of 0 to a grayscale of 2.

In an embodiment, as illustrated in FIG. 10, the output grayscale values OGV corresponding to the low-grayscale values LGV in the boot-up area BUA may be calculated by adding the offset value OSV to the low-grayscale values LGV. For example, the offset value OSV may have a value greater than a grayscale of 0 and less than a grayscale of 1. In such an embodiment, the output grayscale values OGV corresponding to the input grayscale values IGV in the boot-up area BUA may be calculated by Equation 1.

In an embodiment, as illustrated in FIG. 11, the output grayscale values OGV corresponding to the low-grayscale values LGV in the boot-up area BUA is equal to the offset value OSV. In this case, the output grayscale values OGV corresponding to different low-grayscale values LGV in the boot-up area BUA may be equal to each other. For example, the offset value OSV may be a value greater than a grayscale of 0 and less than the threshold grayscale G_TH. In such an embodiment, the output grayscale values OGV corresponding to the input grayscale values IGV in the boot-up area BUA may be calculated by Equation 2.

Figure 12:
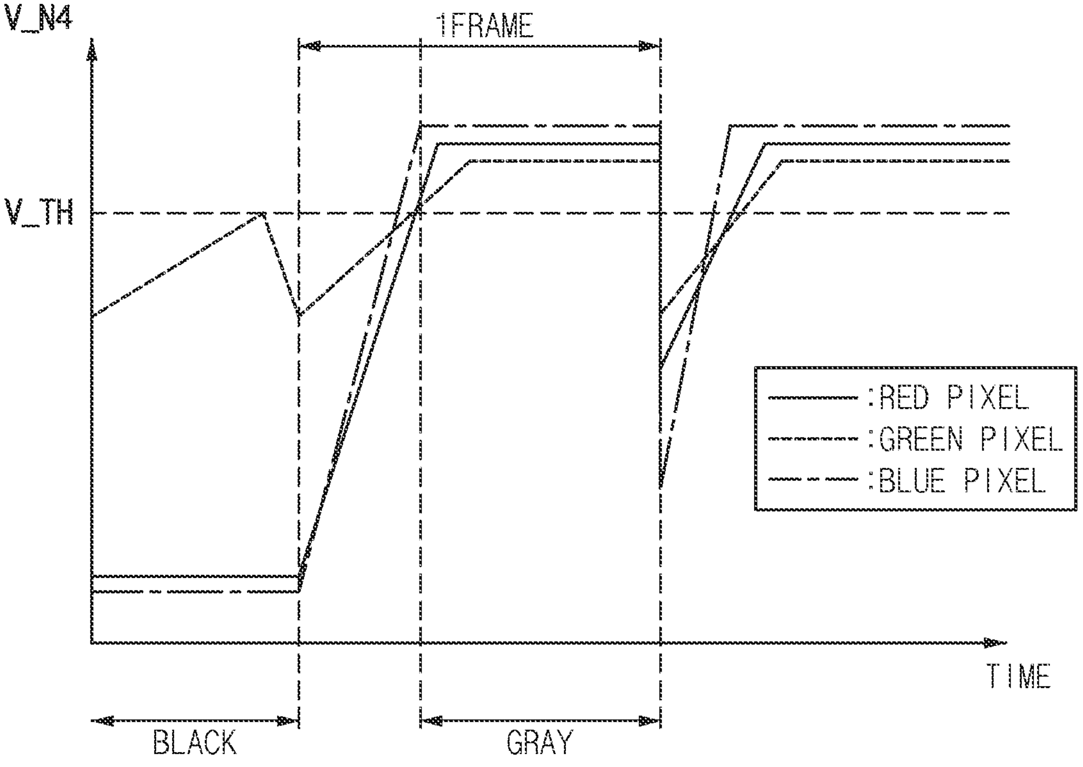
FIG. 12 is a graph illustrating voltages of light emitting diodes of red, green and blue pixels based on input image data which is compensated.

FIG. 12 is a graph illustrating voltages of light emitting diodes of red, green and blue pixels based on input image data which is compensated.

Referring to FIG. 12, when the input grayscale values of the input image data are a grayscale of 0, the red input grayscale values and the blue input grayscale values are not compensated, and the green input grayscale values are compensated. For example, the red output grayscale values and the blue output grayscale values have a grayscale of 0, and the green output grayscale values may have a value greater than a grayscale of 0 and less than a grayscale of 1. In an embodiment, the voltage V_N4 of the first electrode of the green light emitting diode of the green pixel when the green output grayscale value is greater than a grayscale of 0 and less than a grayscale of 1 is greater than the voltage V_N4 of the first electrode of the green light emitting diode when the green output grayscale value has a grayscale of 0, and is less than the threshold voltage V_TH of the light emitting diode. Accordingly, when the input grayscale values of the input image data have a grayscale of 0, the red, green, and blue pixels do not emit light, and the display device may display the black image.

When the input grayscale values of the input image data increase from a grayscale of 0 to a grayscale greater than a grayscale of 0 (for example, a grayscale of 20), the voltage V_N4 of the first electrode of the red light emitting diode, the voltage V_N4 of the first electrode of the green light emitting diode, and the voltage V_N4 of the first electrode of the blue light emitting diode may increase. Although the increase rate of the voltage V_N4 of the first electrode of the green light emitting diode is less than the increase rate of the voltage V_N4 of the first electrode of the red light emitting diode and the increase rate of the voltage V_N4 of the first electrode of the blue light emitting diode, since the voltage V_N4 of the first electrode of the green light emitting diode is greater than the voltage V_N4 of the first electrode of the red light emitting diode and the voltage V_N4 of the first electrode of the blue light emitting diode at a time point at which the input grayscale values of the input image data increase from a grayscale of 0 to the grayscale greater than a grayscale of 0, a time point at which the voltage V_N4 of the first electrode of the green light emitting diode reaches the threshold voltage V_TH of the light emitting diode may be substantially the same as or similar to a time point at which the voltage V_N4 of the first electrode of the red light emitting diode and the voltage V_N4 of the first electrode of the blue light emitting diode reach the threshold voltage V_TH of the light emitting diode. Accordingly, a gray image may be displayed in a first frame in which a display device starts to display the gray image after displaying the black image, and the color dragging phenomenon due to different capacitances and different driving currents of the light emitting diodes may be prevented. Accordingly, the display quality of the display device may be increased.

Figure 13:
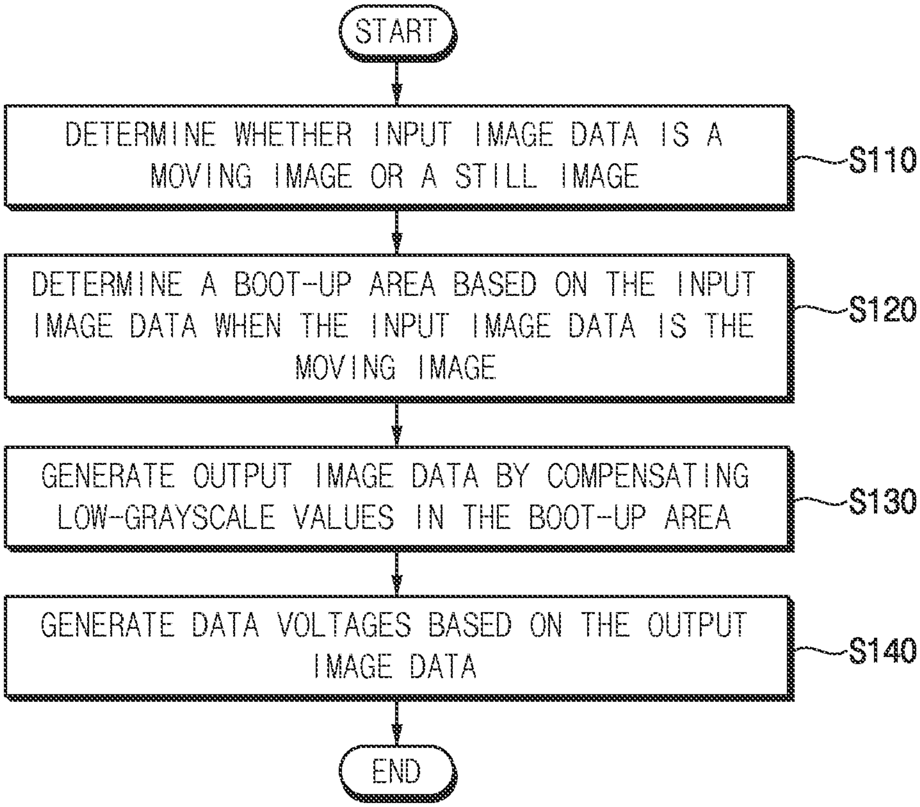
FIG. 13 is a flowchart illustrating a method of driving a display device according to an embodiment.

FIG. 13 is a flowchart illustrating a method of driving a display device according to an embodiment.

Referring to FIGS. 1, 4, and 13, in the method of driving the display device 100, the image determiner 210 of the controller 200 determines whether the input image data IID is the moving image IMG_M or the still image IMG_S (S110). When the input image data IID is the moving image IMG_M, the controller 200 generates the output image data OID by compensating the input image data IID. When the input image data IID is the still image IMG_S, the controller 200 may generate the output image data OID equal to the input image data IID without compensating the input image data IID.

The boot-up area determiner 220 of the controller 200 determines the boot-up area BUA based on the input image data IID when the input image data IID is the moving image IMG_M (S120). In an $n^{th}$ frame, the boot-up area determiner 220 may determine the boot-up area BUA[n] corresponding to the input image data IID of the $n^{th}$ frame based on the input image data IID of the $n^{th}$ frame, and may store the boot-up area BUA[n] corresponding to the input image data IID of the $n^{th}$ frame in the memory 230 of the controller 200.

In an embodiment, the boot-up BUA includes blocks having at least one high-grayscale value among blocks dividing the display panel 110. In an embodiment, the boot-up area BUA includes blocks in which the number of the high-grayscale values is greater than the reference number among blocks dividing the display panel 110. In an embodiment, the boot-up area BUA includes blocks having at least one high-grayscale value among blocks dividing the display panel 110 and blocks adjacent to some of the blocks.

The data compensator 240 of the controller 200 generates the output grayscale values OGV of the output image data OID by compensating low-grayscale values lower than the threshold grayscale among the input grayscale values IGV of the input image data IID in the boot-up area BUA based on the offset value OSV (S130). In an embodiment, the input image data IID of the $n^{th}$ frame is compensated based on the boot-up area BUA[n−1] corresponding to the input image data IID of the $n-1^{th}$ frame stored in the memory 230.

In an embodiment, a threshold grayscale, which is a reference for determining the low-grayscale value, is a grayscale of 1. In an embodiment, the threshold grayscale is m grayscale, where m is a natural number greater than 1.

In an embodiment, the output grayscale values OGV corresponding to the low-grayscale values in the boot-up area BUA is calculated by adding the offset value OSV to the low-grayscale values. In another embodiment, the output grayscale values OGV corresponding to the low-grayscale values in the boot-up area BUA is equal to the offset value OSV.

In an embodiment, the data compensator 240 generates the green output grayscale values of the output image data OID by compensating low-grayscale values among the green input grayscale values of the input image data IID in the boot-up area BUA to mitigate the color dragging phenomenon due to a delay in emission of the green pixels, and does not compensate the red input grayscale values and the blue input grayscale values of the input image data IID. In an embodiment, the data compensator 240 generates the output image data OID by compensating low-grayscale values among the red input grayscale values, low-grayscale values among the green input grayscale values, and low-grayscale values among the blue input grayscale values of the input image data IID in the boot-up area BUA to reduce a difference between light emitting diodes having different characteristics according to color. In this case, the offset value OSV may be different for each red input grayscale value, green input grayscale value, and blue input grayscale value.

Figure 14:
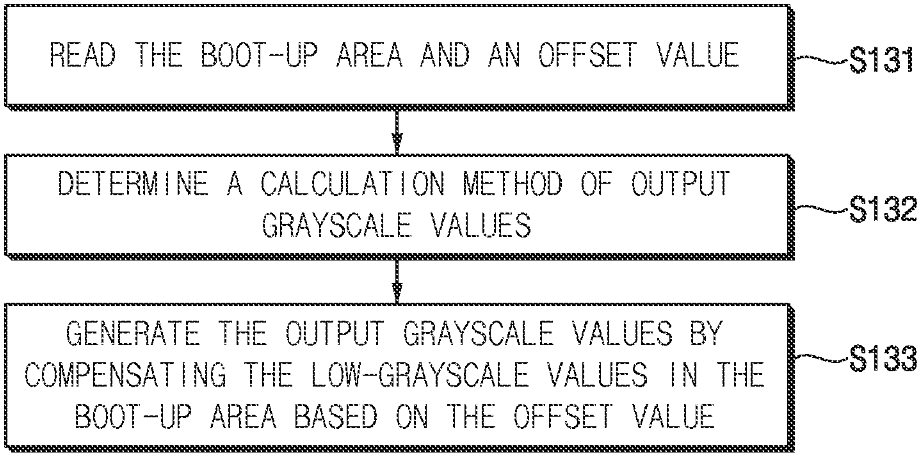
FIG. 14 is a flowchart illustrating a method of generating output image data included in the method of driving the display device in FIG. 13.

FIG. 14 is a flowchart illustrating a method of generating the output image data OID included in the method of driving the display device in FIG. 13.

Referring to FIG. 14, the data compensator 240 reads the boot-up area BUA and the offset value OSV stored in the memory 230 (S131). In an embodiment, the data compensator 240 reads the boot-up area BUA[n−1] corresponding to the input image data IID of the $n-1^{th}$ frame stored in the memory 230 to compensate the input image data IID of the $n^{th}$ frame.

The data compensator 240 determines a calculation method of the output grayscale values OGV (S132). The calculation method of the output grayscale values OGV may be determined according to an offset mode. For example, the offset mode may be stored as 1-bit data. For example, the 1-bit data may be stored in memory 230. For example, the 1-bit data being 0 may indicate that the offset value is to be added to a low-grayscale value to compensate, and the 1-bit data being 1 may indicate that the low-grayscale value is to be set to the offset value to compensate the low-grayscale value.

The data compensator 240 generates the output grayscale values OGV by compensating the low-grayscale values in the boot-up area BUA based on the offset value OSV (S133).

For example, when the offset mode is '0', the output grayscale values OGV corresponding to the low-grayscale values LGV in the boot-up area BUA may be calculated by adding the offset value OSV to the low-grayscale values LGV. The output grayscale values OGV corresponding to input grayscale values IGV greater than or equal to the threshold grayscale G_TH in the boot-up area BUA may be equal to the input grayscale values IGV. Accordingly, the output grayscale values OGV corresponding to the input grayscale values IGV in the boot-up area BUA may be calculated by Equation 1.

For example, when the offset mode is '1', the output grayscale values OGV corresponding to the low-grayscale values LGV in the boot-up area BUA may be equal to the offset value OSV. The output grayscale values OGV corresponding to input grayscale values IGV greater than or equal to the threshold grayscale G_TH in the boot-up area BUA may be equal to the input grayscale values IGV. Accordingly, the output grayscale values OGV corresponding to the input grayscale values IGV in the boot-up area BUA may be calculated by Equation 2.

Referring to FIGS. 1, 4, and 13 again, the data driver 140 may generate the data voltages DV based on the output image data OID (S140). The data driver 140 may convert the digital output grayscale values OGV into the analog data voltages DV.

Figure 15:
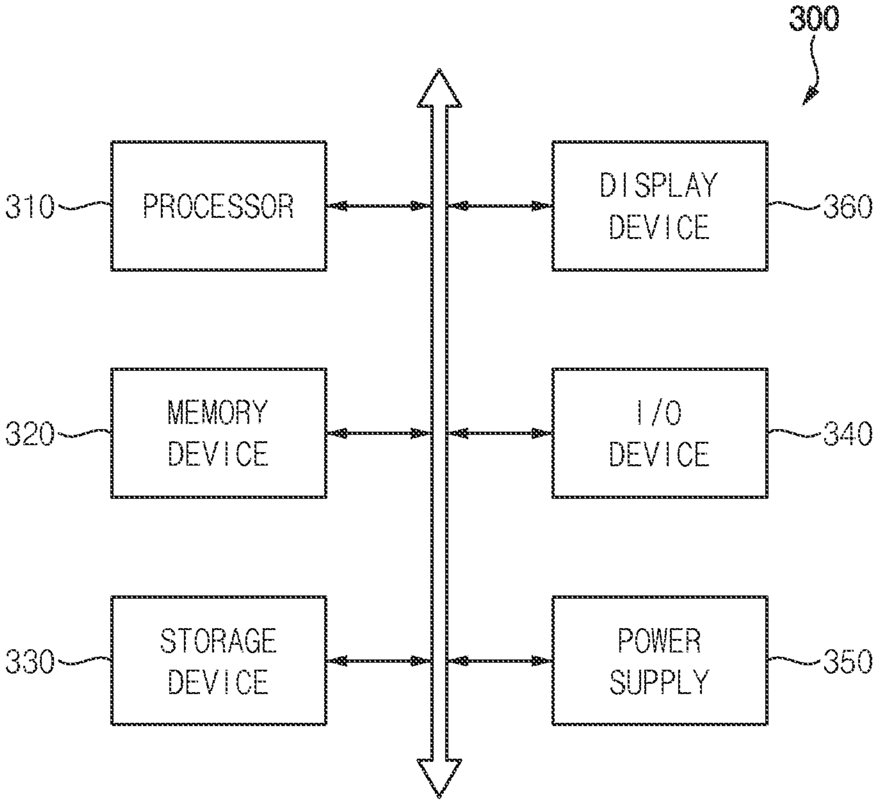
FIG. 15 is a block diagram illustrating an electronic apparatus including a display device according to an embodiment.

FIG. 15 is a block diagram illustrating an electronic apparatus 300 including a display device 360 according to an embodiment.

Referring to FIG. 15, the electronic apparatus 300 may include a processor 310, a memory device 320, a storage device 330, an input/output ("I/O") device 340, a power supply 350, and the display device 360. The display device 360 may correspond to the display device 100 in FIG. 1.

The electronic apparatus 300 may further include a plurality of ports for communicating with a video card, a sound card, a memory card, a universal serial bus ("USB") device, etc.

The processor 310 may perform calculations or tasks. In an embodiment, the processor 310 may be a microprocessor, a central processing unit ("CPU"), or the like. The processor 310 may be coupled to other components via an address bus, a control bus, a data bus, or the like. In an embodiment, the processor 310 may be coupled to an extended bus such as a peripheral component interconnection ("PCI") bus. In an embodiment, the processor 310 may include at least one of the image determiner 210, the boot-up determiner 220, and the data compensator 240 which are illustrated in FIG. 4. The processor 310 may perform the functions of the image determiner 210, the boot-up determiner 220, and the data compensator 240.

The memory device 320 may store data for operations of the electronic apparatus 300. In an embodiment, the memory device 320 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc. In an embodiment, the memory device 320 may include the memory 230 illustrated in FIG. 4.

The storage device 330 may include a solid-state drive ("SSD") device, a hard disk drive ("HDD") device, a CD-ROM device, or the like. The I/O device 340 may include an input device such as a keyboard, a keypad, a touchpad, a touchscreen, a mouse device, etc., and an output device such as a speaker, a printer, etc. The power supply 350 may supply a power required for the operation of the electronic apparatus 300. The display device 360 may be coupled to other components via the buses or other communication links.

In the display device 360, output grayscale values of output image data may be generated by compensating low-grayscale values in a boot-up area among input grayscale values of input image data when the display device 360 displays a moving image, so that the color dragging phenomenon in the boot-up area may be mitigated. Accordingly, display quality of the display device 360 may be increased.

The display device according to the embodiments may be applied to a display device included in a computer, a notebook, a mobile phone, a smart phone, a smart pad, a PMP, a PDA, an MP3 player, or the like.

Although the display devices, the control circuits, and the methods of driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device, comprising:

a display panel which displays an image based on data voltages, and includes a display area divided into a plurality of blocks;

a control circuit which receives input image data, determines a boot-up area among the blocks when the input image data is a moving image and includes at least one of the blocks having at least one high-grayscale value higher than a reference greyscale, performs a compensation that generates output image data by increasing low-grayscale values lower than a threshold grayscale among input grayscale values of the input image data in the boot-up area, and generates the output image data equal to the input image data without the compensation when the input image data is a still image; and a data driving circuit which generates the data voltages based on the output image data.

2. The display device of claim 1, wherein the control circuit comprises:

a first logic circuit which determines whether the input image data is the moving image or a still image;

a second logic circuit which determines the boot-up area based on the input image data when the input image data is the moving image; and a third logic circuit which generates output grayscale values of the output image data by compensating the low-grayscale values in the boot-up area based on an offset value.

3. The display device of claim 2, wherein the control circuit further comprises:

a memory which stores the boot-up area and the offset value.

4. The display device of claim 3, wherein, in an $n^{th}$ frame, the boot-up area corresponding to the input image data of the $n^{th}$ frame is stored in the memory, and the input image data of the $n^{th}$ frame is compensated based on the boot-up area corresponding to the input image data of an $n-1^{th}$ frame stored in the memory, where n is an natural number greater than 1.

5. The display device of claim 2, wherein the output grayscale values corresponding to the low-grayscale values in the boot-up area are calculated by adding the offset value to the low-grayscale values.

6. The display device of claim 2, wherein the output grayscale values corresponding to the low-grayscale values in the boot-up area are equal to the offset value.

7. The display device of claim 2, wherein the third logic circuit generates green output grayscale values of the output image data by compensating the low-grayscale values in the boot-up area among green input grayscale values of the input image data.

8. The display device of claim 1, wherein the threshold grayscale is a grayscale of 1.

9. The display device of claim 1, wherein the threshold grayscale is a natural number greater than 1.

10. The display device of claim 1, wherein the boot-up area includes at least one of the blocks in which a number of the high-grayscale values is greater than a reference number.

11. An electronic device comprising:

a first logic circuit which determines whether input image data is a moving image or a still image;

a second logic circuit which determines a boot-up area among blocks of a display panel of the electronic device when the input image data is the moving image and includes at least one grayscale higher than a reference grayscale; and a third logic circuit which generates output grayscale values of output image data by compensating low-grayscale values lower than a threshold grayscale among input grayscale values of the input image data in the boot-up area based on an offset value, and generates the output image data equal to the input image data without the compensating when the input image data is the still image.

12. The electronic device of claim 11, wherein the output grayscale values corresponding to the low-grayscale values in the boot-up area are calculated by adding the offset value to the low-grayscale values.

13. The electronic device of claim 11, wherein the output grayscale values corresponding to the low-grayscale values in the boot-up area are equal to the offset value.

14. The electronic device of claim 11, further comprising a memory which stores the boot-up area and the offset value, wherein, in an $n^{th}$ frame, the boot-up area corresponding to the input image data of the $n^{th}$ frame is stored in the memory, and the input image data of the $n^{th}$ frame is compensated based on the boot-up area corresponding to the input image data of an $n-1^{th}$ frame stored in the memory, where n is a natural number greater than 1.

15. The electronic device of claim 11, wherein the threshold grayscale is a grayscale of 1.

16. The electronic device of claim 11, wherein the boot-up area includes the blocks in which a number of high-grayscale values higher than the reference grayscale is greater than a reference number.

17. A method of driving a display device, the method comprising:

determining whether input image data is a moving image or a still image;

determining a boot-up area among blocks of a display panel of the display device when the input image data is the moving image and includes at least one of the blocks having at least one high-grayscale value higher than a reference greyscale;

generating output grayscale values of output image data by compensating low-grayscale values lower than a threshold grayscale among input grayscale values of the input image data in the boot-up area based on an offset value;

generating the output image data equal to the input image data without the compensating when the input image data is the still image; and generating data voltages based on the output image data.

18. The method of claim 17, wherein the output grayscale values corresponding to the low-grayscale values in the boot-up area are calculated by adding the offset value to the low-grayscale values.

19. The method of claim 17, wherein the boot-up area includes at least one of the blocks in which a number of the high-grayscale values greater than a reference number.

* * * * *